Oct. 22, 1957   E. DE FAYMOREAU   2,810,874
SERVOMOTOR CONTROL SYSTEM
Filed Sept. 7, 1955
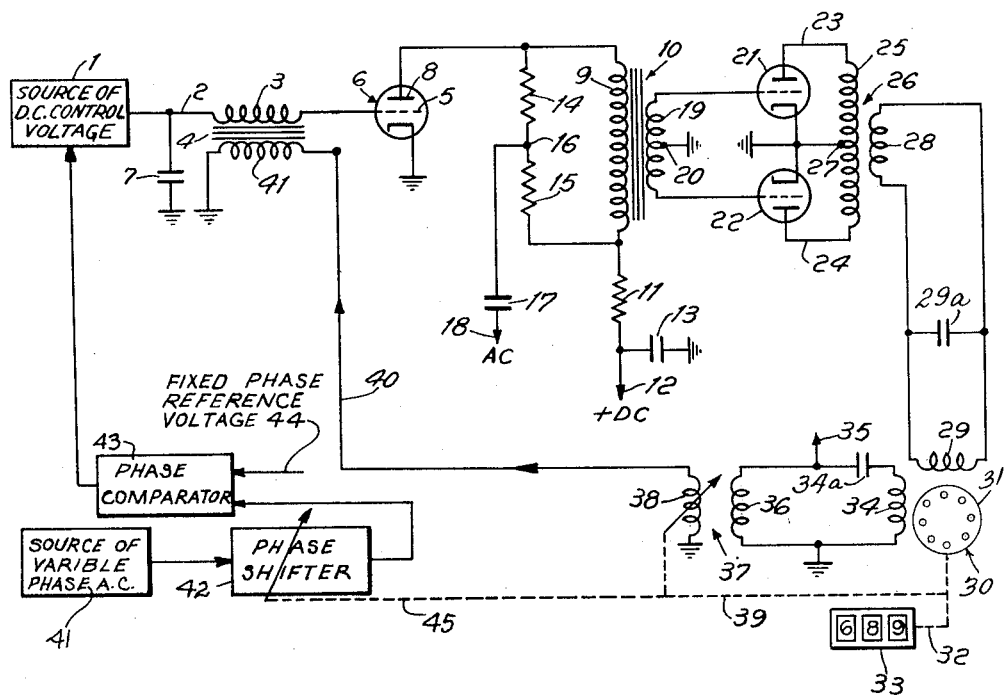
INVENTOR
ETIENNE de FAYMOREAU
BY
ATTORNEY

United States Patent Office 2,810,874
Patented Oct. 22, 1957

2,810,874

SERVOMOTOR CONTROL SYSTEM

Etienne de Faymoreau, Nutley, N. J., assignor to International Telephone and Telegraph Corporation, Nutley, N. J., a corporation of Maryland Application September 7, 1955, Serial No. 532,818

8 Claims. (Cl. 318—28)

This invention relates to motor control systems, particularly such as are used to drive indicating devices.

In many systems D. C. voltages are used to control reversible motors which are mechanically linked to indicators adapted to be turned in opposite directions. Such an arrangement is found in the airplane navigation system known as "Tacan." In the distance measuring system of Tacan, interrogating pulses from an airplane are transmitted to a beacon station and returned to the airplane therefrom after a delay proportional to the distance of the airplane from the beacon. In the airplane this delay is, in effect, translated into a D. C. voltage whose magnitude is used to control the direction and speed of a motor driving a simple reversible mechanical counter that serves as an indicator. It is not feasible to directly drive the motor with D. C. voltages and so the D. C. voltages are used to control A. C. voltages which in turn drive the motor. The D. C. voltages usually require separate D. C. amplifiers, and additional somewhat complex circuitry has heretofore been employed in applying the D. C. voltages to control the A. C. currents. Since such equipment is used in an airplane, it is obviously desirable to reduce it to the minimum at which satisfactory operation can be obtained.

A contributing factor adding to the complexity of such apparatus is the requirement for preventing "hunting" by the motor and its associated indicator. In "hunting," the motor, due to its inertia, tends to overshoot its mark first in one direction and then, in overcorrecting, in the other direction. These oscillations of the motor and the indicator device linked thereto make accurate readings difficult. To prevent such hunting additional apparatus is required which, as pointed out hereinabove, further adds to the equipment employed.

An object of the present invention is a provision of an improved motor control system having a relatively simple arrangement, particularly one including an anti-hunt feature.

Other and further objects of the present invention will become apparent, and the foregoing will be better understood with reference to the following description of an embodiment thereof, reference being had to the drawings, in which:

Fig. 1 is a schematic diagram of a motor control system embodying the present invention; and Fig. 2 is a simplified schematic drawing of a portion of the system of Fig. 1 used in explaining the operation thereof.

In carrying out the present invention it is recognized that the tendency of the motor to overshoot varies in accordance with its speed. Provision is made according to the present invention for feeding back an A. C. voltage whose amplitude varies in accordance with the speed of rotation of the motor to oppose the alternating current driving the motor and thereby limit or control its speed.

In accordance with a feature of the present invention, a single tube is employed both as a D. C. amplifier for the D. C. voltages and as an amplifier for the A. C. feed-back voltages, and also controls the alternating current to the motor.

Referring now to the details of the arrangement illustrated in the drawings, and particularly to Fig. 1, D. C. control voltages from a suitable source 1 are applied over a line 2 via the secondary 3 of a feed-back transformer 4 to the grid 5 of a triode 6 whose conductivity is controlled thereby. A bypass condenser 7 couples line 2 to ground. The anode 8 of triode 6 is connected via the primary 9 of a transformer 10 and a resistor 11 to a source of polarizing potential 12 which has a bypass condenser 13 connected thereacross to ground. A pair of resistors, 14 and 15, are connected in series with each other and across the primary 9, the center point 16 at which said resistors are connected being coupled via a condenser 17 to an A. C. voltage source 18.

The secondary 19 of output transformer 10 is center tapped as indicated at 20 and there connected to ground. The secondary coil 19 feeds the grids of a push-pull amplifier including triodes 21 and 22 whose cathodes are connected to ground and whose anodes are coupled to the opposite ends 23 and 24 of the primary 25 of a transformer 26, the primary being likewise center tapped, as indicated at 27, and connected to ground. The secondary 28 of transformer 26 is connected to the control winding 29 of a two-phase induction motor 30 whose rotor 31 is mechanically linked by a suitable means indicated at 32 to a simple reversible counter 33. The reference winding 34 of motor 30 is fed with alternating current from a source 35 at the same frequency as source 18 and having a fixed phase with reference thereto. The same A. C. source 35 is also connected to the field winding 36 of an induction generator 37 whose rotating coil 38 is mechanically linked, as indicated at 39, to the rotor of motor 30 and rotates simultaneously therewith. Coil 38 is connected via line 40 to one side of the primary 41 of the feed-back transformer 4.

Considering the operation of the system of Fig. 1, it will be seen that triode 6 is arranged in essentially an A. C. bridge circuit, as indicated in Fig. 2, with tube 6 and resistor 14 connected in series in one branch and resistors 11 and 15 connected in series in the other branch. Since condenser 13 is a bypass condenser, it together with the D. C. source 12 are effectively bypassed and therefore present no impedance to alternating current. It will be seen that the bridge has 4 impedances consisting of the three resistors 11, 14, and 15, and triode 6, with one impedance in each arm of the bridge. The reference A. C. voltage source 18 is applied between one pair of opposite junctions of the bridge and the primary 9 is connected between the other pair of opposite junctions. Resistors 14 and 15 are preferably of equal value. It will therefore be seen that when the impedance of triode 6 is equal to that of resistor 11 the bridge will be balanced and no current will flow through primary 9. Consequently, under these conditions there is no driving voltage for the motor and the motor is stationary. However, if an unbalance exists in the bridge, that is, the impedance of triode 6 is greater or less than that of resistor 11, a resultant A. C. current will flow through primary 9 whose phase and amplitude is dependent upon the impedance of tube 6. This primary current is then amplified in the push-pull amplifier and fed to the control winding of motor 30 where it is compared with the current in the reference winding 34. The current in the reference winding 34 comes from source 35 which is at the same frequency as source 18 and is tied in phase thereto. For this purpose, both sources 35 and 18 may be derived from a common source (not shown) and should, like D. C. source 12, have their returns grounded. The phase difference in currents through windings 29 and 34 required to drive the motor 30 may be adequately provided by the phase shift in transformer 26 or, if inadequate, conventional means such as condensers 29a and 34a may be employed. The rotating coil or armature 38 of generator 37, rotating at the same speed as motor 30, develops a voltage which varies in amplitude in accordance with this speed and shifts 180° in phase in accordance with the direction of rotation. This voltage is applied across the primary 41 of feed-back transformer 4 and via the secondary to the grid of tube 5 in which it is amplified, the connections to the transformer 4 being such that the voltage fed back via transformer 4 appears on the anode of tube 6 with the proper phase to oppose the flow of current through primary 9. This will be more clearly understood if it is appreciated that the direction of rotation of coil 38 corresponds with the direction of rotation of the rotor of motor 30 and that the phase of the output produced by coil 38 will also be determined by the direction in which it is turning. It will thus be seen that the voltage fed back along line 40 and transformer 4 will tend to slow down the motor and, consequently, prevent its overshooting, thus diminishing hunting instability.

Any suitable conventional arrangement may be used for balancing the system to bring the motor 30 to a halt at a determined position. For example, in the distance measuring equipment of the receiver of Tacan, differences in distance are expressed as variations of phase of the received signal; and this variable phase information coming from a suitable source of variable phase A. C. voltage 41 is fed through an adjustable phase shifter 42 to a phase comparator or detector 43 where it is compared with a fixed phase reference voltage 44 to produce a variable D. C. control voltage output which may be directly used as the source of D. C. control voltage 1 or via a D. C. amplifier in source 1. As the motor 30 rotates, it shifts the phase shifter 42 by a mechanical linkage 45 until the output of the phase shifter 42 is in such phase relation with the fixed phase voltage 44 that the output of phase comparator 43 to source 1 balances the bridge of Fig. 2 and brings the motor to a halt.

While I have described my invention above with reference to specific embodiments, it is to be understood that the invention is to be interpreted according to the state of the prior art and the appended claims.

I claim:

1. A motor control system for controlling a motor in accordance with the magnitude of D. C. control voltages applied thereto comprising a source of variable D. C. voltages, an induction motor having a control winding, a reference winding, and a rotor, a bridge network having four impedances each arranged in one of the arms thereof, at least one of said impedances being variable, means applying an A. C. voltage across one pair of opposed junctions of said bridge, the other pair of opposed junctions of said bridge serving as its output terminals, means responsive to the variable D. C. voltage for varying the impedance of said one impedance in accordance with the magnitude of said D. C. voltage, means coupled to said other pair of opposed junctions of said bridge and responsive to the voltage thereat to cause A. C. current of a corresponding phase and amplitude to flow through the motor control winding, a source of alternating current, and means coupling said source of alternating current to the motor reference winding.

2. A motor control system according to claim 1 in which the frequency of said reference A. C. voltage and the frequency of the current from said source of alternating current are the same.

3. A motor control system according to claim 1 in which said one impedance comprises an electron discharge device, further including means for applying said variable D. C. voltage to the control element of said device to vary the impedance thereof.

4. A motor control system according to claim 1 in which said means coupled to said other pair of opposed junctions of said bridge comprises a transformer having its primary coupled to said other pair of opposed junctions, and means coupling the secondary to the control winding of said induction motor.

5. A motor control system according to claim 4 in which said means coupling the secondary to the control winding comprises an amplifier.

6. A motor control system according to claim 1 further including means responsive to the rotation of the rotor of said motor for producing an alternating current voltage whose amplitude varies in accordance with the speed of rotation of said rotor and means for applying said last mentioned voltage to said bridge in a direction to diminish the output thereof.

7. A motor control system according to claim 6 wherein said means responsive to the rotation of the rotor comprises a generator having a fixed and rotatable winding, means mechanically coupling said rotatable winding to the rotor of the motor to cause said winding to rotate in accordance with the speed of rotation of the rotor, means for coupling said source of alternating current to the fixed winding and means for coupling said rotatable winding to said bridge.

8. A motor control system according to claim 7 wherein said one impedance comprises an electron discharge device connected in said bridge, said device having a control element, further including means for applying the D. C. voltages to said control element, and means coupling said rotatable winding to said control element.

References Cited in the file of this patent

UNITED STATES PATENTS

| | | |
|---|---|---|
| 2,373,208 | Trucksess | Apr. 10, 1945 |
| 2,417,868 | Glass | Mar. 25, 1947 |
| 2,574,837 | Mouzon | Nov. 13, 1951 |